(12) United States Patent
Bernard et al.

(10) Patent No.: US 12,116,947 B2
(45) Date of Patent: Oct. 15, 2024

(54) METHOD OF DETERMINING FUEL EVAPORATION FROM AN ENGINE OIL SUMP

(71) Applicant: BORGWARNER LUXEMBOURG AUTOMOTIVE SYSTEMS SA, Bascharage (LU)

(72) Inventors: Marceau Bernard, Bastogne (BE); Maxime Lienhart, Aumetz (FR); Oguz Iscimen, Bertrange (LU)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 275 days.

(21) Appl. No.: 17/633,149

(22) PCT Filed: Sep. 30, 2020

(86) PCT No.: PCT/EP2020/077318
§ 371 (c)(1),
(2) Date: Feb. 4, 2022

(87) PCT Pub. No.: WO2021/063997
PCT Pub. Date: Apr. 8, 2021

(65) Prior Publication Data
US 2022/0333546 A1     Oct. 20, 2022

(30) Foreign Application Priority Data
Oct. 3, 2019   (GB) .................................. 1914284

(51) Int. Cl.
*F02D 41/22*   (2006.01)
*F01M 11/10*   (2006.01)
*G01M 15/04*   (2006.01)

(52) U.S. Cl.
CPC ............. *F02D 41/22* (2013.01); *F01M 11/10* (2013.01); *G01M 15/042* (2013.01);
(Continued)

(58) Field of Classification Search
CPC .... F02D 41/22; F02D 41/0025; F02D 41/021; F02D 41/047; F02D 41/30; F02D 41/34;
(Continued)

(56) References Cited

U.S. PATENT DOCUMENTS

| 2004/0099252 A1 | 5/2004 | Nagaishi et al. |
| 2006/0201487 A1 | 9/2006 | Mallebrein et al. |

(Continued)

FOREIGN PATENT DOCUMENTS

| CN | 104791121 A | 7/2015 |
| DE | 10222808 A1 | 11/2003 |

(Continued)

OTHER PUBLICATIONS

International Search Report and Written Opinion issued on Dec. 10, 2020 in counterpart International Patent Application No. PCT/EP2020/077318 (10 pages, in English).

(Continued)

*Primary Examiner* — Hai H Huynh
(74) *Attorney, Agent, or Firm* — Warner Norcross + Judd LLP

(57) ABSTRACT

A method of determining the total evaporation rate of fuel from an oil sump of an engine comprising: a) defining for said fuel, a plurality (n-1) of zones, each zone comprising a separate temperature range, and corresponding to a particular fuel constituent portion; b) determining or estimating the mass of said particular fuel constituent portion present in the sump for each zone; c) for each zone, determining an evaporation rate based on oil temperature; and the corresponding mass determined in step b); d) summing the evaporation rates for each zone from step c) to provide said total evaporation rate.

7 Claims, 4 Drawing Sheets

(52) U.S. Cl.
CPC ... *F01M 2250/00* (2013.01); *F02D 2200/023* (2013.01); *F02D 2200/06* (2013.01)

(58) Field of Classification Search
CPC .......... F02D 2200/023; F02D 2200/06; F02D 2200/0608; F02D 2200/0612; F02D 2250/08; F02D 2250/11; F01M 11/10; F01M 15/042; F01M 2250/00
USPC ..... 123/198 D, 572–574; 701/103–105, 107; 73/114.39
See application file for complete search history.

(56) References Cited

U.S. PATENT DOCUMENTS

| | | |
|---|---|---|
| 2013/0297184 A1 | 11/2013 | Nilsson et al. |
| 2015/0292418 A1 | 10/2015 | Haft et al. |

FOREIGN PATENT DOCUMENTS

| | | |
|---|---|---|
| JP | 2004197591 A | 7/2004 |
| JP | 2007270772 A | 10/2007 |
| JP | 2009144613 A | 7/2009 |
| JP | 2014202154 A | 10/2014 |

OTHER PUBLICATIONS

Anonymous: "Arrhenius equation: Difference between revisions—Wikipedia", Feb. 9, 2019, XP055754745, Retrieved from the Internet: URL: https://en.wikipedia.org/w/index.php?title=Arrhenius_equation&diff-882484046&oldid=882484007 [retrieved on Nov. 27, 2020].

Office Action in CN Application 202080062542.5, dated May 17, 2023, with English translation (20 pages).

Fuel deposit of prior Art

Mass of fuel in oil during warm-up
+
Mass of fuel in oil during crank
⇒ Fuel in oil [mg]

Boil-off rate estimation of prior Art

Fuel in oil [mg], Engine temperature → Boil-off rate [mg/s] → Injection correction

METHOD OF DETERMINING FUEL EVAPORATION FROM AN ENGINE OIL SUMP

CROSS-REFERENCE TO RELATED APPLICATION(S)

This patent application is a National Stage of and claims the benefit of priority to International Patent Application No. PCT/EP2020/077318, filed on Sep. 30, 2020, which claims the benefit of Great Britain Patent Application No. 1914284.3, filed on Oct. 3, 2019, the entirety of which is incorporated herein by reference.

TECHNICAL FIELD

This relates to a method of determining the evaporation (boil-off) of fuel deposit in an oil sump. It further relates to a method of determining the amount of fuel deposit (residue) in an oil sump.

BACKGROUND OF THE INVENTION

Due to modern engines mechanizations and gasoline content used (with ethanol), the phenomena of fuel in oil has generally been previously ignored or roughly estimated needs to be precisely assessed to reach drivability and emission constraints. Under cold temperatures, the mixture applied to start and to warm-up the engine is very rich. Not all of the fuel injected is burnt: a part from this fuel is transported into the exhaust and the remaining part enters the oil sump.

A first direct consequence of the fuel deposit is the oil level increase. A second is the oil quality modification. A third one is the phenomena called the "fuel boil-off". When the oil temperature starts to rise, the fuel will evaporate and enter the engine through the blow-by valve. This will lead to rich mixture, drivability problems and emission non-compliancy.

So in other words on gasoline engines e.g. and especially with high percentage of ethanol, rich mixture is applied during crank and warm-up phases in the combustion chamber. Only a part depending on the fuel stoichiometry will burn. The rest is either evacuating through the exhaust or entering the oil sump through piston walls.

It is known to estimate the fuel entering the oil sump with parametric maps depending on engine temperature, ethanol concentration and injected fuel. The inputs may be temperature; ethanol concentration; fuel injected and the outputs are percentage of injected fuel entering in the oil sump and the total mass of fuel in the oil sump Fuel boil-off rate estimation (i.e. estimation of the fuel evaporating from the sump) is performed with parametric maps depending on engine temperature, ethanol concentration and corrected with engine load. The inputs are temperature, ethanol concentration, engine load and the output are the rate of fuel evaporating from the oil. With this single rate of fuel, they will reduce the amount of modeled accumulated fuel in the sump.

US20130297184A relates to a method of determining Outgassing Of A Fuel From A Lubricant Within An Internal Combustion Engine And Lambda Value Adaptation Based On The Determined Outgassing Of Fuel. In this patent application, the outgassing of fuel (fuel boil-off) is not in feed-forward control, they based the estimation on the deviation on lambda controller. US20040099252A1: This relates to estimation of oil-diluting fuel quantity of engine Previous methods does not take into account the chemical components of fuel that is entering in the oil. Especially with ethanol mixture, some chemical components evaporate at low temperature and not at high temperature. So if we consider only one component of the fuel (one single mass of fuel in the oil) and if we operate the engine only under low temperature, the model will subtract the mass of fuel within the oil over time until the oil is free of fuel, the evaporated mass of fuel is then false because not all of the fuel evaporates at low temperature. And if then the engine is operated at higher temperature, the model will assume there is no fuel in the oil anymore, but the chemical components which have not been evaporated at low temperature will evaporate and will lead to wrong mixture adaptation, driveability issue, emission breakthrough.

It is an object of the invention to overcome these problems.

SUMMARY OF THE INVENTION

In one aspect is provided a method of determining the total evaporation rate of fuel from an oil sump of an engine comprising:
a) defining for said fuel, a plurality (n-1) of zones, each zone comprising a separate temperature range, and corresponding to a particular fuel constituent portion;
b) determining or estimating the mass of said particular fuel constituent portion present in the sump for each zone;
c) for each zone, determining an evaporation rate based on oil temperature; and the corresponding mass determined in step b);
d) summing the evaporation rates for each zone from step c) to provide said total evaporation rate.

In step c) the determination of evaporation rates may assume that all chemical components of each fuel constituent portion evaporate with same evaporation rate.

In step c) the evaporation rate for the zone may be determined form the following equation:

$$\dot{m}_Z = m_Z a_Z e^{\frac{-E_Z}{RT_{oil}}}$$

where:
R is the gas constant (8.31 $J \cdot K^{-1} \cdot mol^{-1}$)
T is the oil temperature (in K);
Ez is activation energy (in $J \cdot mol^{-1}$) with respect to that zone
a is pre-exponential factor or frequency of collision ($s^{-1}$) with respect to that zone;
and $m_z$ is the initial amount of fuel with respect to that zone z present in the oil sump.

One or more zones are selected such that the corresponding temperature ranges may be such that the evaporation curve of the fuel is substantially linear within this range.

The method may include integrating the total evaporation rate with respect to time to determine the amount of fuel removed from the sump during a time period.

The method may include determining the amount of fuel in an oil sump dependent from said determined amount of fuel removed.

The method may include determining the amount of fuel in the oil sump dependent additionally on an initial amount of fuel present in an oil sump minus the amount of fuel removed.

The method may include determining the amount of fuel in the oil sump dependent additionally on the amount of fuel entering the sump during cranking and/or warm up.

BRIEF DESCRIPTION OF THE DRAWINGS

The present invention is now described by way of example with reference to the accompanying drawings in which.

DESCRIPTION OF THE PREFERRED EMBODIMENTS

Figure 1:
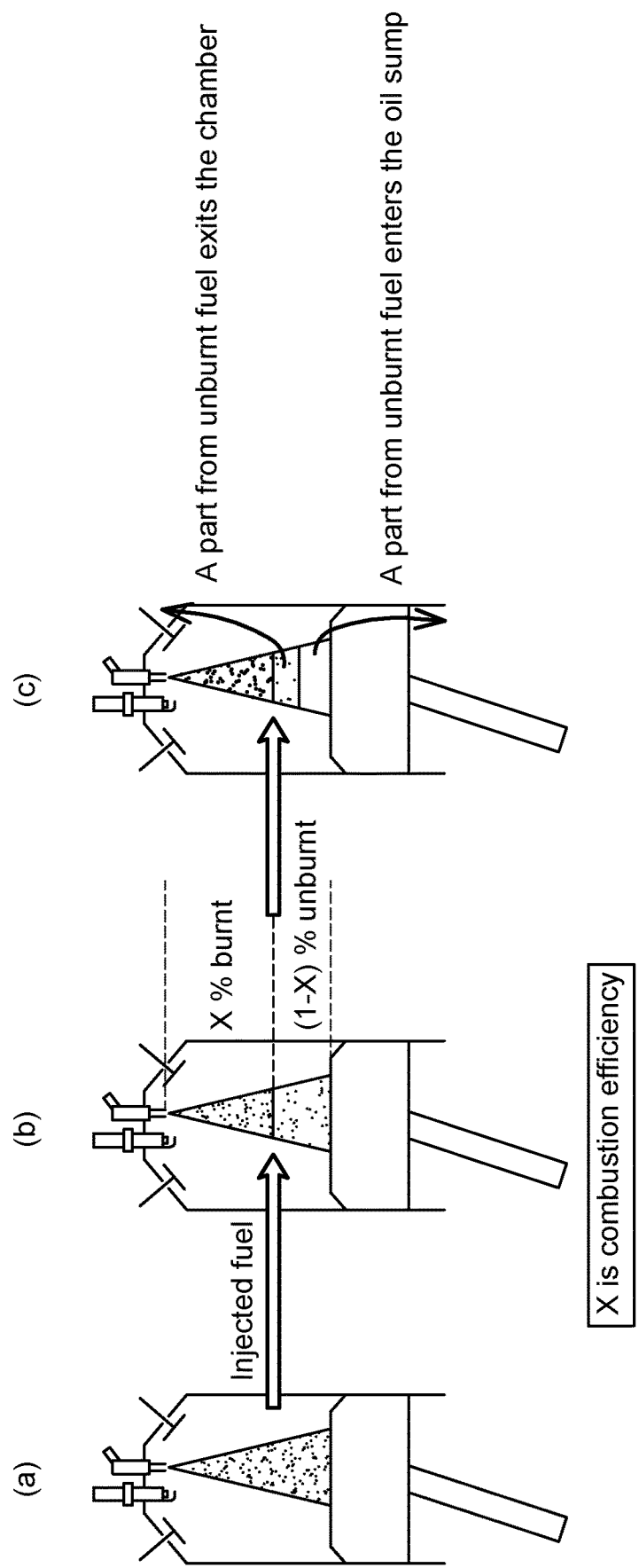
FIG. 1 shows a schematic figure showing a cross sectional view of an engine cylinder.

To recap, during the cranking, a mass from the injected fuel will enter in the oil sump. FIG. 1 shows a schematic figure showing a cross sectional view of an engine cylinder. FIG. 1a shows fuel being injected into the cylinder. A proportion (X %) will be burnt and the remaining (1-X %) portion of unburnt fuel (see FIG. 1b). The unburnt fuel (FIG. 1c) will exit the cylinder through the exhaust ports valves and a portion will leave between the cylinder walls and piston and will enter the oil sump.

So in other words on gasoline engines e.g. and especially with high percentage of ethanol, rich mixture is applied during crank and warm-up phases in the combustion chamber. Only a part depending on the fuel stoichiometry will burn. The rest either evacuates through the exhaust or enters the oil sump through piston walls. Risks with fuel entering the sump mean there is reduced lubrication capability, increased oil level and boil-off phenomena.

Fuel Entering Sump During Cranking

This mass of fuel entering the sumps during cranking depends on a number of factors: total mass of fuel injected during the cranking event; fuel ethanol percentage; engine temperature (oil or coolant); ambient temperature.
Fuel Entering the Sump During Warm-Up During the warm-up, rich mixture is applied to have stoichiometric exhaust. A part from the unburnt fuel enters the oil sump. The mass entering the oil sump can also be regarded as depending on: the mass of unburnt fuel (mass injected x[1-"combustion efficiency"]); ethanol percentage; engine temperature (oil or coolant); ambient temperature; engine load.

When the oil temperature starts to rise, the fuel contained in the oil starts to evaporate. The vapors will enter the engine through the positive crankcase ventilation valve (PCV) (or blow-by). The PCV is closed under high load but the evaporating phenomena is assumed to be continuous. If boil-off is ignored: there will be mixture (Lambda) control perturbation; false fuel adaptation learning; false diagnostic faults raised; and problems with emission compliance.

Figures 2, 3:
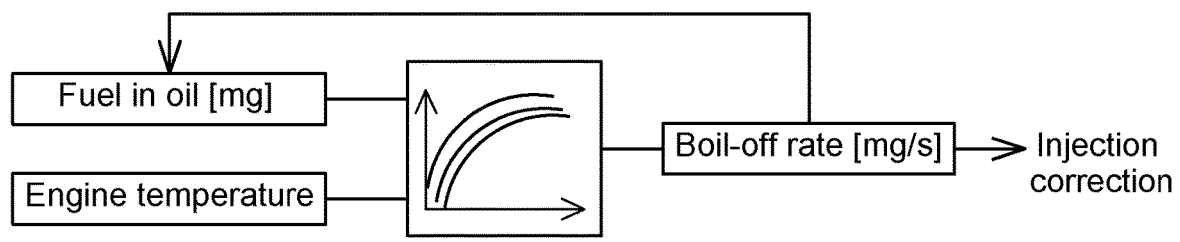
FIG. 2 shows how in the prior art the fuel (deposit) quantity in the oil (of a sump) is determined.
FIG. 3 shows the boil-off rate estimation technique of the prior art.

FIG. 2 shows how in the prior art the fuel (deposit) quantity in the oil (of a sump) is determined. The mass of fuel in the oil or entering the sump is determined as the sum of the mass of fuel into the oil during cranking and that entering the oil during warm up. FIG. 3 shows the boil-off rate estimation technique of the prior art. The boil off rate is determined as a function of the amount of fuel in the oil and the engine temperature. Stored maps may be used to determine the boil-off rate from these parameters. The boil off rate is then fed-back and used to recalculated i.e. update the fuel in oil parameter. The boil-off rate and/or the fuel in sump quantity may be used to appropriately control adjust e.g. injection of fuel.

Invention

Gasoline is composed from different chemical components that evaporate at different temperatures: Depending on the temperature, a portion of the fuel is available to evaporate. Considering a short driving cycle, the prior art model will reduce the whole modeled fuel in oil whereas the fuel is not available to evaporate. The fuel that enters the oil sump is composed from different chemical components which evaporate at different temperatures. This leads to an evaporation fraction depending on temperature.

Figure 5:
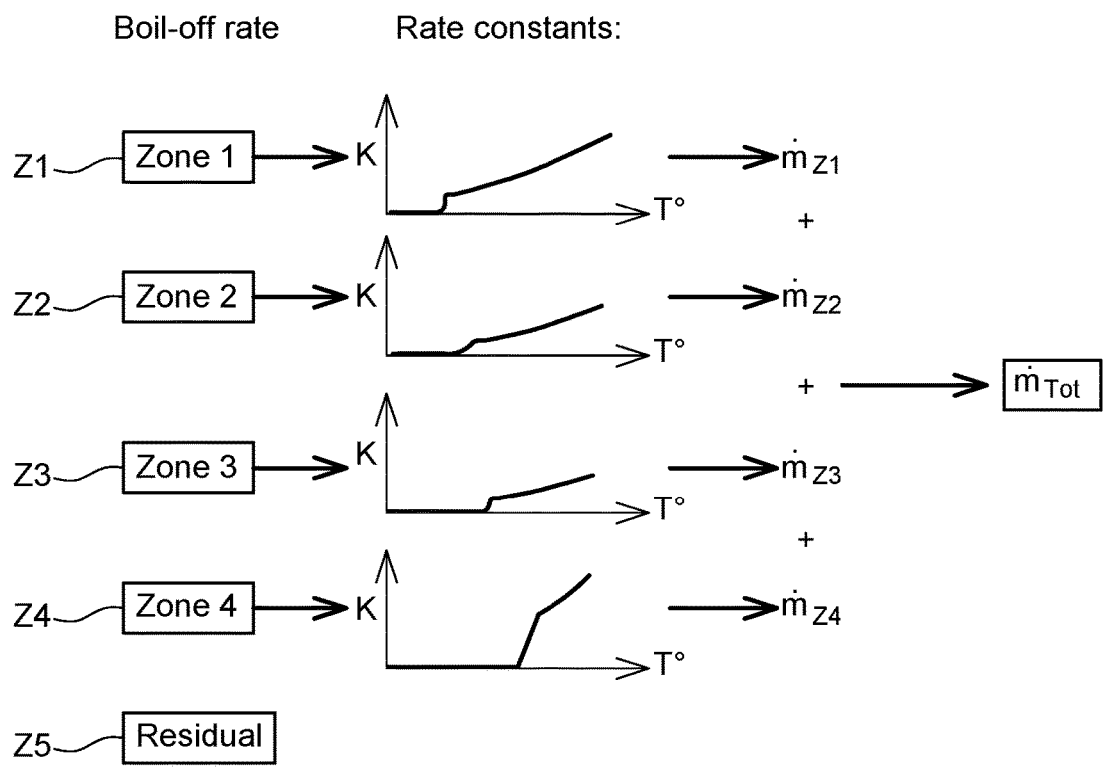
FIG. 5 shows illustrates an example of how the boil-off rate is determined according to one example.

The problem of error in fuel deposit estimation and boil off rate is solved by taking into account the chemical components of fuel that is entering or in the oil sump. FIG. 5a shows an evaporation curve for gasoline.

Figure 4A:
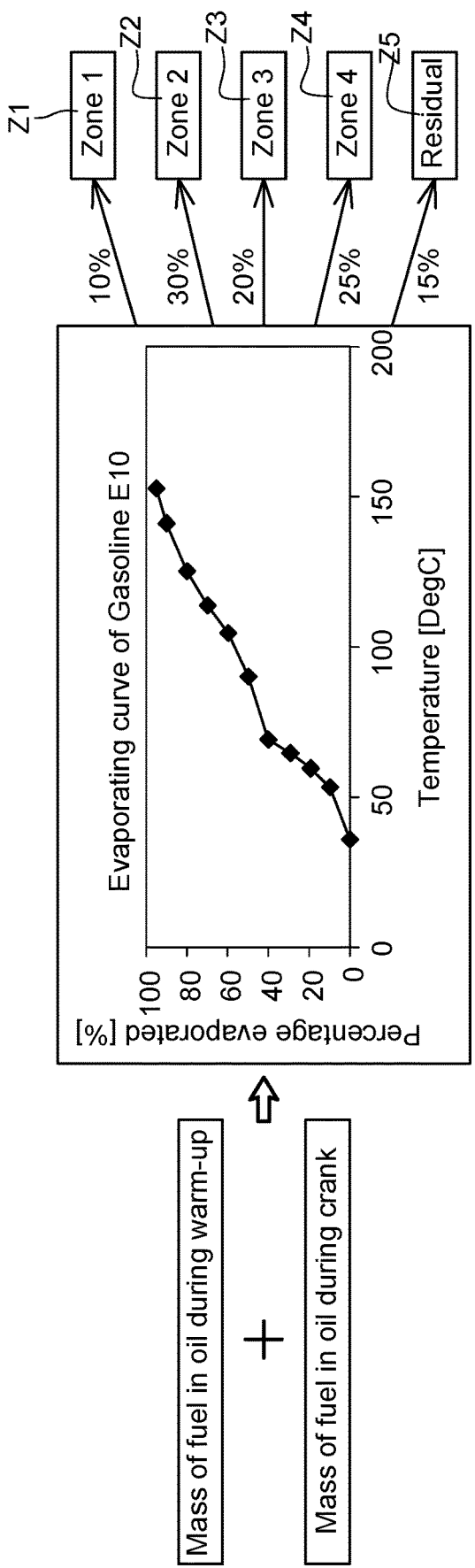
FIGS. 4a and 4b illustrate multi-zonal method according to one example.

The inventors have determined that more accurate boil-off estimation can be determined by considering the evaporation curve. In examples the evaporation curve is used and split into a plurality of temperature zones for the oil, where for each zone it is considered that a particular proportion of fuel is evaporated. This is shown in FIG. 4a and also in FIG. 4b which shows the evaporation curve and the zones Z1, Z2, Z3, Z4 and Z5. These zones are equivalent to temperature ranges which may or may not be contiguous. It is often not possible to take into account all the components that are in the fuel so according to aspects a multi-zone model of fuel in oil is provided based on evaporation curve of gasoline.

So the problem of wrong estimation of fuel evaporating (fuel boil off estimation) from the oil is solved by treating fuel in respect of each of the zones (temperature ranges) referenced above separately, with separate evaporation rates and reducing the amount of evaporated fuel in the fuel boil off rate estimation only with respect to the affected zone(s). Each zone is assumed to correspond to chemical components which evaporates with same evaporation rate.

EXAMPLES

Fuel In Oil Deposit Estimation

In examples the (mass of) fuel, and thus the mass of fuel that enters the sump, and/or assumed to be in the in the oil sump is considered as comprising a plurality of components, each with different evaporation rates or characteristics depending on the temperature. Thus the mass of fuel is effectively split into a multi-zonal mass and each zone mass is considered separately in terms of determining the amount evaporated or in the sump. For each zone it is assumed that the fuel portion thereof is evaporated at a particular rate dependent on e.g. temperature FIGS. 4a as well as 4b shows examples of evaporation curves that is the percentage of the fuel evaporated against temperature. The curve according to examples is divided into a number of zones as shown. In the figure, the curve is split i.e. separated into five zones, Z1, Z2, Z3, Z4 and Z5. Preferably as is the case here, the zones are selected i.e. the curve is divided, such that the "curve "in each section/zone is generally or substantially linear.

Depending on the fuel mixture e.g. ethanol percentage (here it is 10%), then the proportion of the fuel with respect to (in) each zone may be determined or pre-estimated so preset. So all the fuel mass (that is modeled to enter, exist, and/or be evaporated from the oil sump) is allocated in the example to five different zones: So it is assumes that 10% of the fuel is in zone Z1; 30% is in the zone Z2; 20% is in the zone Z3; 30% is in the zone Z4; 10% is in a so called "Residual fuel" zone Z5.

The zones (defined by temperature ranges) may thus be considered as eluding to component portions of the fuel mix, the fuel mix assumed thus to have ("n") constituent parts, each constituent part having a different but single evaporation characteristic. The last zone or residual zone may be assumed to remain unevaporated as the temperature of the engine may never reach that where any reasonable evaporation of constituents of that zone occurs.

Figure 4B:
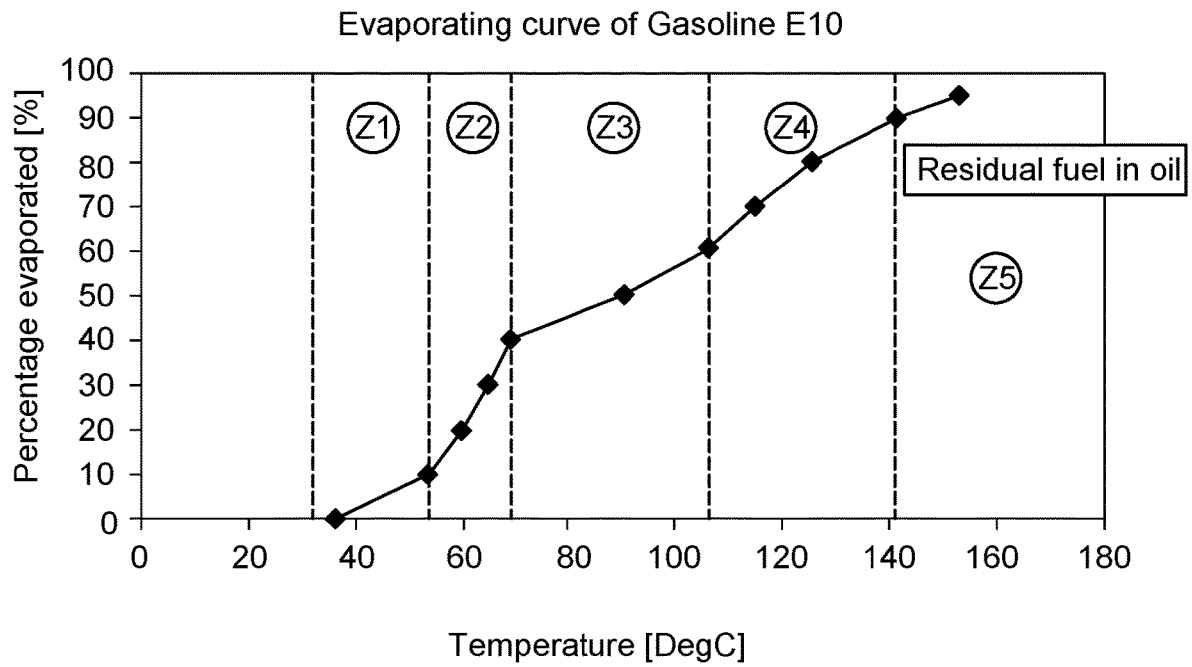

The percentage constituent of each zone is calibratable e.g. can be pre-determined foe the methodology depending on fuel type/mixture e.g. ethanol percentage known by ethanol percentage estimation or ethanol sensor. The last zone is considered as residual fuel because the oil will never rarely exceed 140° C. so the quantity of the chemical components that enters in the oil sump will never be evaporated and will stay until oil change. This logic of splitting fuel into multi-zone model is shown in FIGS. 4a and 4b as well as FIG. 5 which will be explained hereinafter.

Depending on the oil temperature (assumed to be the fuel in oil temperature), the separate the evaporation effect with respect to fuel in each zone can be determined separately (independently) for a boil-off rate estimation.

Fuel Boil-Off Rate Estimation

Each zone is assumed to content chemical components that follow an Arhenius law to evaporate. Arhenius law is defined by:

$$k(T) = ae^{\frac{-E}{RT}}$$

k(T) is the reaction rate $s^{-1}$
R is the gas constant (8.31 $J \cdot K^{-1} \cdot mol^{-1}$)
T is temperature (in K)
E is activation energy (in $J \cdot mol^{-1}$)
a is pre-exponential factor or frequency of collision ($s^{-1}$)
K(T) is a reaction rate, multiplied by the mass, you have an evaporation rate (boil-off rate)
$\dot{m} = m \times K(T)$. $\dot{m}$ is the boil-off rate, m the mass able to boil-off, K(T) reaction rate Each zone has and is assumed to have its own pre-exponential factor and activation energy which allow separately each evaporation rate of each zone to be determined.

Zone 1 evaporates only starting from 35° C. Zone 2 from 54° C., zone 3 from 70° C., zone 4 from 105° C. (for the example of E10).

To compute the evaporating fuel rate for each zone, the mass of fuel contained in the actual zone is multiplied by the reaction rate for the actual engine temperature.

$$\dot{m}_{Zn} = m_{Zn}a_{Z1}e^{\frac{-E_{Zn}}{RT_{oil}}}$$

Where n is the zone number. So this may be computed a plurality of zones, e.g. preferably this is calculated for each zone, or each zone minus the residual zone where appropriate. So for zone 1 this is:

$$\dot{m}_{Z1} = m_{Z1}a_{Z1}e^{\frac{-E_{Z1}}{RT_{oil}}}$$

In the example, the total evaporating fuel (boil-off rate) is the summation of the four evaporating flows for zones Z1, Z2, Z3, Z4 is as follows:

$$\dot{m}_{Boiloff} = \dot{m}_{z1} + \dot{m}_{z2} + \dot{m}_{z3} + \dot{m}_{z4}$$

In the example the evaporating flow is for zone 5 is ignored i.e. assumed to be zero.

FIG. 6 shows the above logic.

In other examples, the total evaporating fuel (boil-off rate) is the summation of the five evaporating flows for zones Z1, Z2, Z3, Z4 and Z5

$$\dot{m}_{Boiloff} = \dot{m}_{z1} + \dot{m}_{z2} + \dot{m}_{z3} + \dot{m}_{z4} + \dot{m}_{z5}$$

The value of the total (i.e. aggregate) boil-off rate can be used in models to determine the total fuel in the oil, as well as for determining engine control parameters such as injection correction For example, a model can be provided similar to that of FIG. 4. Here the value of the quantity of fuel in oil can be determined from an initial value of the quantity of oil, plus optionally the amount of fuel entering the sump during warm up and/or cranking, minus the integral of the above computed total boil-off rate with respect to time.

Fuel entering in the sump may be divided into separate masses with respect to each zone in the multi-zone model. The evaporation rate is physical based. Therefore, the model is more accurate and more sensitive to normal driving conditions (short trip without complete warming of oil). Another big advantage of this model is to be able to raise the information to the driver that the quantity of the fuel in the oil is very high and can lead to engine damage if the driver repeats short trip operations.

The invention claimed is:

1. A method of determining the total evaporation rate of fuel from an oil sump of an engine, the method comprising:
    a) defining for said fuel, a plurality (n-1) of zones, each zone comprising a separate temperature range, and corresponding to a particular fuel constituent portion, wherein each zone is assumed to correspond to chemical components which evaporate with the same evaporation rate;
    b) determining or estimating the mass of said particular fuel constituent portion present in the sump for each zone;
    c) for each zone and its corresponding fuel constituent portion, determining an evaporation rate based on oil temperature and the corresponding mass determined in step b);
    d) summing the evaporation rates for each zone and its corresponding fuel constituent portion from step c) to provide said total evaporation rate; and
    e) indicating a fault situation of the engine or controlling the engine dependent on the total evaporation rate determined from step d) or a parameter derived therefrom;
    wherein in step a) the zones are selected such that the corresponding temperature ranges are such that the evaporation curve of the fuel is substantially linear within this range, which evaporation curve is a percentage of fuel evaporated against temperature.

2. A method as claimed in claim 1 wherein in step c) the determination of evaporation rates assumes that all chemical components of each fuel constituent portion evaporate with same evaporation rate.

3. A method as claimed in claim 1 wherein in step c) the evaporation rate for the zone is determined from the following equation:

$$\dot{m}_Z = m_Z a_Z e^{\frac{-E_Z}{RT_{oil}}}$$

where:

R is the gas constant (8.31 J·K$^{-1}$·mol$^{-1}$);

T is the oil temperature (in K);

Ez is activation energy (in J·mol$^{-1}$) with respect to that zone;

a is pre-exponential factor or frequency of collision (s$^{-1}$) with respect to that zone; and $m_z$ is the initial amount of fuel with respect to that zone z present in the oil sump.

4. A method as claimed in claim 1 including integrating the total evaporation rate with respect to time to determine the amount of fuel removed from the sump during a time period.

5. A method as claimed in claim 1 including determining the amount of fuel in an oil sump dependent from said determined amount of fuel removed.

6. A method as claimed in claim 5 including determining the amount of fuel in the oil sump dependent additionally on an initial amount of fuel present in an oil sump minus the amount of fuel removed.

7. A method as claimed in claim 5 including determining the amount of fuel in the oil sump dependent additionally on the amount of fuel entering the sump during cranking and/or warm up.

* * * * *